United States Patent [19]

Sigwald

[11] 3,800,978
[45] Apr. 2, 1974

[54] LIQUID TANK PROVIDED WITH DE-GASING MEANS

[75] Inventor: Jacques Sigwald, Taverny, France

[73] Assignees: Automobiles Peugot, Paris; Regie Nationale des Usines Renault, Boulogne-Billancourt, both of, France

[22] Filed: Sept. 29, 1972

[21] Appl. No.: 293,564

[30] Foreign Application Priority Data
Dec. 13, 1971 France .............................. 71.44663

[52] U.S. Cl. ............ 220/85 R, 137/587, 220/85 VS, 280/5 A
[51] Int. Cl. ........................................... B65d 25/00
[58] Field of Search .......... 220/85 S, 85 VS, 85 UR, 220/86 R, 44 A, 85 R, 44 R; 137/587; 280/5 A

[56] References Cited
UNITED STATES PATENTS 3,643,690  2/1972  Sarai ................................ 220/86 R
2,677,345  5/1954  Baldwin, Jr. ...................... 220/86 R FOREIGN PATENTS OR APPLICATIONS
759,318  8/1940  Germany ........................... 220/85 R

*Primary Examiner*—William I. Price
*Assistant Examiner*—Allan N. Shoap
*Attorney, Agent, or Firm*—Burns, Doane, Swecker & Mathis

[57] ABSTRACT

Liquid tank structure in which the filling piping connected to the bottom part of the tank is connected to the top part of the tank by a venting pipe having an upper portion, a lower portion constituting a liquid trap and a generally upwardly extending portion. A chamber is inserted in the upwardly extending portion of the venting pipe and a conduit including a constricted passage connects the lower part of the chamber to the tank. The volume of the part of the chamber below the points of connection of the chamber to the upwardly extending portion of the venting pipe is equal to at least the volume of the lower portion of the venting pipe which constitutes the trap.

4 Claims, 1 Drawing Figure

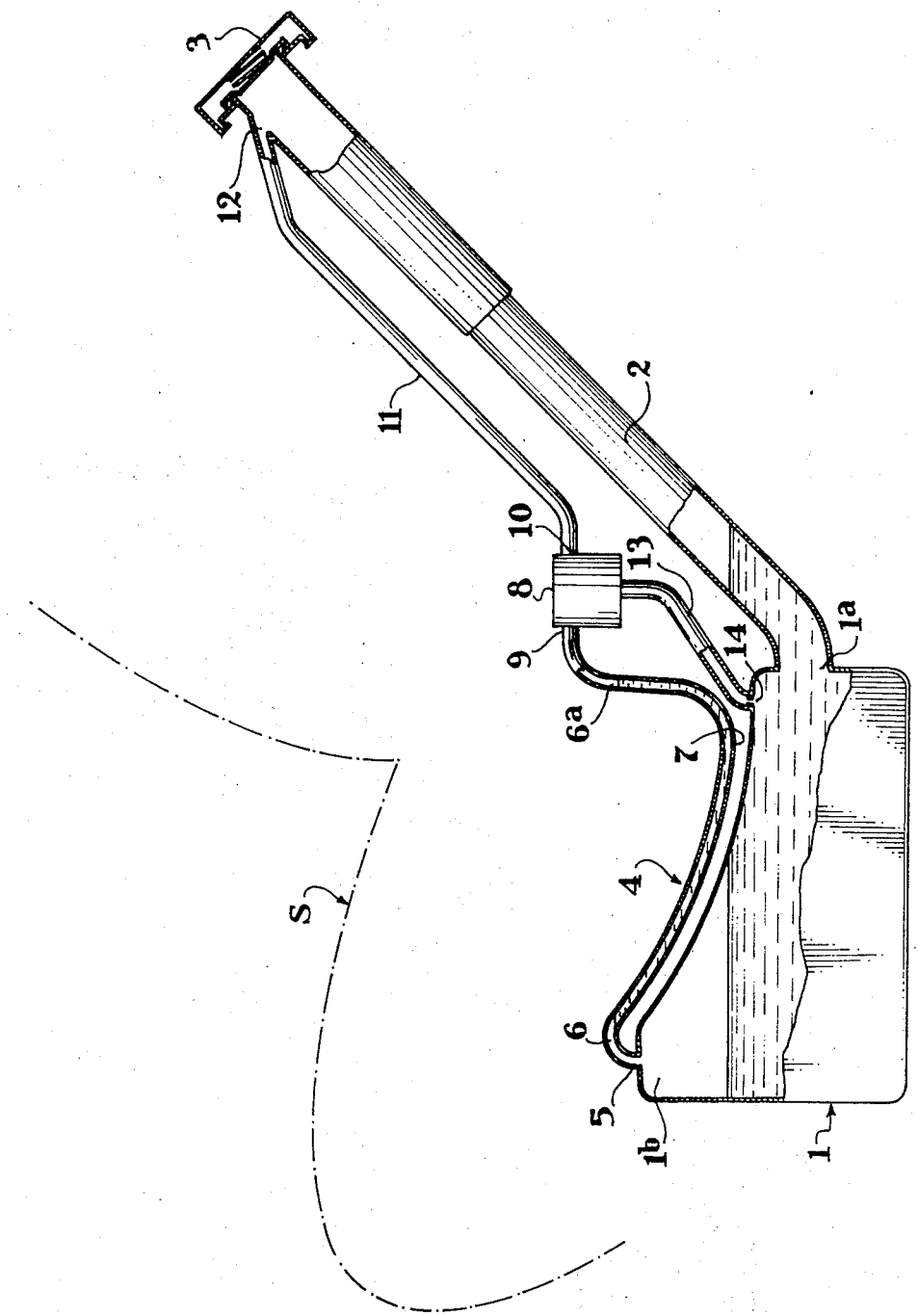

LIQUID TANK PROVIDED WITH DE-GASING MEANS

The present invention relates to liquid tanks and in particular fuel tanks for automobile vehicles.

In some vehicles, and in particular automobile vehicles, it may be advantageous to dispose the tank under a seat, for example the rear seat. For imperative reasons of location and available space it is sometimes necessary to adopt the following arrangement:
A filling pipe communicating with the exterior of the body of the vehicle is connected to the tank at a point below the top part of the latter and a venting conduit extends from said top part, curves downwardly and constitutes a syphon or trap and leads to the surrounding air, for example in the vicinity of the upper part of the filling pipe. The following drawback results. As the trap remains full of liquid, in the course of filling excessive pressures are created in the tank which cause the liquid to be expelled from the tank.

An object of the present invention is to avoid this undesirable drawback in a simple manner.

The present invention provides a liquid tank provided with filling piping which is connected to the tank below the upper part of the tank and a venting pipe which extends from the upper part of the tank and includes first an upper point and then a lower art constituting a trap followed by a generally rising part communicating with the atmosphere, wherein a chamber is inserted in the rising part of the venting pipe at a higher level than that of said upper point, the lower part of the chamber being connected to the tank through a conduit including a constricted passage, the volume of the chamber located below the points of connection of the venting pipe being equal to at least the volume of the part of the venting pipe which constitutes the trap.

Further features and advantages of the invention will be apparent from the ensuing description with reference to the accompanying drawing.

In the drawing, the single FIGURE shows a liquid tank according to the invention.

The fuel tank 1 shown in the drawing is placed under a seat S and can be filled by way of piping 2 ordinarily closed by a filler cap 3. The piping 2 leads to a lateral wall of the tank at a point 1a located distinctly below its upper part 1b.

A venting pipe 4 is connected at 5 to the upper part of the tank, includes an upper point 6 followed by a lower part 7 constituting a liquid trap, and is connected to a chamber 8 at a point 9 located at a level at least as high as that of the point 6. The venting pipe has one end connected to the chamber 8 at point 10 followed by a rising part 11 and the opposite end connected at 12 to the piping 2 below the cap 3. The base of the chamber 8 is connected to the tank 1 by way of a conduit 13 provided with a constricted passage 14 which is preferably in the vicinity of the connection between the conduit 13 and the tank. The volume of the chamber 8 located below points 9 and 10 must be equal to at least that of the trap constituted by the venting pipe between the point 6 and the point 6a where the level of the liquid trapped in the trap is established.

The tank according to the invention operates in the following manner:

During the withdrawal of the liquid from the tank, the level drops normally in the tank 1 and piping 2 but the trap remains full of liquid below the points 6 and 6a.

When the tank is being filled, de-gasing occurs first by way of the filling piping until the level of the liquid has closed the base part. Thenceforth, the air enclosed in the part 1b can no longer escape and its pressure gradually increases until it reaches a value sufficient to urge the liquid contained in the trap towards the chamber 8. During this stage, the amount of liquid which rises in the conduit 13 is insignificant owing to the small dimension of the constricted passage 14.

When the liquid has been urged into the chamber 8, the venting pipe is completely free between the point 5 and the point 12 and de-gasing can continue normally without danger of the liquid being expelled back through the filling orifice.

At the end of the filling, the trap and the chamber 8 are full of liquid but whereas the trap remains full during all of the period of removal of the liquid as described hereinbefore, the chamber 8 is emptied progressively through the constricted passage 14 and the whole structure is once more ready for the next filling.

Having now described my invention what I claim as new and desire to secure by Letters Patent is:

1. A liquid tank structure comprising a tank having an upper part and a lower part, a filling piping connected to the lower part of the tank, a venting pipe which is connected to the upper part of the tank, the venting pipe having an upper portion adjacent the tank, a lower portion constituting a liquid trap and a generally upwardly extending portion communicating with the atmosphere, a chamber inserted in the upwardly extending portion of the venting pipe, the chamber having a lower part, and a conduit including a constricted passage connecting the lower part of the chamber to the tank, the volume of a part of the chamber located below parts of the upwardly extending portion of the venting pipe between which the chamber is inserted being equal to at least the volume of the lower portion of the venting pipe which constitutes the trap.

2. A liquid tank structure as claimed in claim 1, wherein the constricted passage is disposed in the vicinity of the connection between the conduit and the tank.

3. A liquid tank structure as claimed in claim 1, wherein the constricted passage has such cross-sectional area relative to the cross-sectional area of the filling piping that the amount of fuel which can rise in said conduit during the time it takes to fill the tank is insufficient to fill said part of the chamber located below said parts of said upwardly extending portion of the venting pipe.

4. A liquid tank structure comprising a tank having an upper part and a lower part, a filling piping having a bottom end connected to the lower part of the tank and a top inlet end, a venting pipe which is connected to the upper part of the tank, the venting pipe having an upper portion adjacent the tank, a lower portion constituting a liquid trap and a generally upwardly extending portion communicating with the interior of the filling piping adjacent said top inlet end, a chamber inserted in the upwardly extending portion of the venting pipe, the chamber having a lower part, and a conduit including a constricted passage connecting the lower part of the chamber to the tank, the volume of a part of the chamber located below parts of the upwardly extending portion of the venting pipe between which the chamber is inserted being equal to at least the volume of the lower portion of the venting pipe which constitutes the trap.

* * * * *